(12) United States Patent
Tian et al.

(10) Patent No.: US 11,469,609 B2
(45) Date of Patent: *Oct. 11, 2022

(54) POWER SUPPLY CIRCUIT, POWER SUPPLY DEVICE AND CONTROL METHOD

(71) Applicant: GUANGDONG OPPO MOBILE TELECOMMUNICATIONS CORP., LTD., Guangdong (CN)

(72) Inventors: Chen Tian, Guangdong (CN); Jialiang Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 69 days.

This patent is subject to a terminal disclaimer.

(21) Appl. No.: 17/017,376

(22) Filed: Sep. 10, 2020

(65) Prior Publication Data
US 2020/0412268 A1 Dec. 31, 2020

Related U.S. Application Data

(63) Continuation of application No. 16/415,598, filed on May 17, 2019, now Pat. No. 10,819,246, which is a
(Continued)

(51) Int. Cl.
*H02M 3/335* (2006.01)
*H02J 7/02* (2016.01)
(Continued)

(52) U.S. Cl.
CPC .................. *H02J 7/02* (2013.01); *G05F 1/10* (2013.01); *H02H 9/00* (2013.01);
(Continued)

(58) Field of Classification Search
CPC .... H02J 7/02; G05F 1/10; H02H 9/00; H02M 3/33592; H02M 3/33576; H02M 3/335;
(Continued)

(56) References Cited

U.S. PATENT DOCUMENTS

| 4,612,610 | A  | * | 9/1986  | Farnsworth | ....... | H02M 3/33507 |
|           |    |   |         |            |         | 363/19       |
| 10,819,246| B2 | * | 10/2020 | Tian       | ........| H02M 7/00    |

FOREIGN PATENT DOCUMENTS

| JP | 0421185  | 2/1992 |
| JP | H0646535 | 2/1994 |

(Continued)

OTHER PUBLICATIONS

KIPO, Office Action for KR Application No. 10-2019-7018301, dated Dec. 11, 2020.
(Continued)

*Primary Examiner* — Adolf D Berhane
(74) *Attorney, Agent, or Firm* — Hodgson Russ LLP

(57) ABSTRACT

Provided are a power supply circuit, a power supply device and a control method. The power supply circuit includes a primary rectifier unit, a modulation unit, a transformer, a secondary rectifier and filtering unit, a current feedback unit, and a control unit. The power supply circuit removes a liquid electrolytic capacitor at a primary side. Moreover, the control unit may determine a type of a voltage of input alternating current, and set a current limit value in the current feedback unit according to the type of the voltage of the alternating current.

20 Claims, 7 Drawing Sheets

Related U.S. Application Data continuation of application No. PCT/CN2017/103010, filed on Sep. 22, 2017.

(51) Int. Cl.
  *G05F 1/10* (2006.01)
  *H02M 7/12* (2006.01)
  *H02H 9/00* (2006.01)
  *H02M 7/155* (2006.01)
  *H02M 7/00* (2006.01)

(52) U.S. Cl.
  CPC ......... *H02M 3/33592* (2013.01); *H02M 7/00* (2013.01); *H02M 7/12* (2013.01); *H02M 7/1557* (2013.01)

(58) Field of Classification Search
  CPC .......... H02M 3/155; H02M 7/00; H02M 7/12; H02M 7/1557; H02M 7/33546; H05B 47/10
  See application file for complete search history.

(56) References Cited

FOREIGN PATENT DOCUMENTS

| | | |
|---|---|---|
| JP | H10285819 | 10/1998 |
| JP | 2006217695 | 8/2006 |
| JP | 2007049833 | 2/2007 |
| JP | 2019536287 | 12/2019 |
| WO | 2017133379 | 8/2017 |

OTHER PUBLICATIONS

JPO, Notice of Allowance for JP Application No. 2019-536287, dated Feb. 18, 2021.

* cited by examiner

POWER SUPPLY CIRCUIT, POWER SUPPLY DEVICE AND CONTROL METHOD

CROSS-REFERENCE TO RELATED APPLICATIONS

This application is a continuation of U.S. application Ser. No. 16/415,598, filed May 17, 2019, which is a continuation of International Application No. PCT/CN2017/103010, filed Sep. 22, 2017, the entire disclosures of which are incorporated herein by reference.

TECHNICAL FIELD

The present disclosure generally relates to a charging technology field, and more particularly, to a power supply circuit, a power supply device and a control method.

BACKGROUND

A power supply circuit typically includes a primary conversion unit and a secondary conversion unit. The primary conversion unit generally includes a primary rectifier unit and a primary filtering unit. The primary filtering unit typically adopts one or more high-capacity liquid electrolytic capacitors (such as, liquid aluminum electrolytic capacitors) to perform primary filtering on a voltage after primary rectification.

The liquid electrolytic capacitor has disadvantages of short life and easy cracking, resulting in a short life and insecurity of a conventional power supply circuit.

SUMMARY

The present disclosure provides a power supply circuit, a power supply device and a control method.

In a first aspect, a power supply circuit is provided. The power supply circuit includes: a primary rectifier unit, configured to perform rectification on input alternating current to output a first voltage having a periodically changing voltage value; a modulation unit, configured to modulate the first voltage to generate a second voltage; a transformer, configured to generate a third voltage based on the second voltage; a secondary rectifier and filtering unit, configured to perform rectification and filtering on the third voltage to generate an output voltage and an output current of the power supply circuit; a current feedback unit, configured to receive the output current, and to send a feedback signal to the modulation unit when a current value of the output current reaches a preset current limit value, wherein the modulation unit is configured to perform modulating the first voltage to generate the second voltage according to the feedback signal, to limit the current value of the output current below the current limit value; and a control unit, configured to determine a voltage of the alternating current, to set the current limit value of the current feedback unit as a first current value when the voltage of the alternating current is of a first type, and to set the current limit value of the current feedback unit as a second current value when the voltage of the alternating current is of a second type, in which an amplitude of the voltage of the first type is greater than that of the voltage of the second type, and the first current value is greater than the second current value.

In a second aspect, a power supply device is provided. The power supply device includes a housing, a circuit board, and a power supply circuit. The circuit board is enclosed by the housing. The power supply circuit is positioned on the circuit board, and the power supply circuit is as described in the first aspect.

In a third aspect, a control method of a power supply circuit is provided. The control method includes: performing rectification on input alternating current to output a first voltage having a periodically changing voltage value; modulating the first voltage to generate a second voltage; generating a third voltage based on the second voltage; and performing rectification and filtering on the third voltage to generate an output voltage and an output current of the power supply circuit; generating a feedback signal when a current value of the output current reaches a preset current limit value, wherein modulating the first voltage is performed according to the feedback signal, to limit the current value of the output current below the current limit value; determining a voltage of the alternating current; setting the current limit value as a first current value when the voltage of the alternating current is of a first type; and setting the current limit value as a second current value when the voltage of the alternating current is of a second type, in which an amplitude of the voltage of the first type is greater than that of the voltage of the second type, and the first current value is greater than the second current value.

DETAILED DESCRIPTION

In the related art, both a primary rectifier unit and a primary filtering unit are provided at a primary side of a power supply circuit. The primary filtering unit generally includes one or more liquid electrolytic capacitors. The liquid electrolytic capacitor has properties of large capacity and strong filtering ability. Due to the existence of the liquid electrolytic capacitor, an output provided by the power supply circuit may be a constant direct current. However, the liquid electrolytic capacitor has disadvantages of short life and easy cracking, resulting in a short life and insecurity of the power supply circuit. Moreover, charging a battery in a device to be charged with the constant direct current will result in polarization and lithium precipitation of the battery, such that a service life of the battery may be reduced.

In order to improve the service life and safety of the power supply circuit, and to relieve the polarization and lithium precipitation of the battery during charging process, embodiments of the present disclosure provide a power supply circuit without the liquid electrolytic capacitor at the primary side. Such a power supply circuit may be used to charge the battery in the device to be charged.

The device to be charged used in embodiments of the present disclosure may refer to a mobile terminal, such as a "communication terminal" (or "terminal" for short). The "terminal" may include, but is not limited to a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The communication terminal configured to communicate via the wireless interface may be referred to as "wireless communication terminal", "wireless terminal" and/or "mobile terminal". Examples of a mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver.

Figure 1:
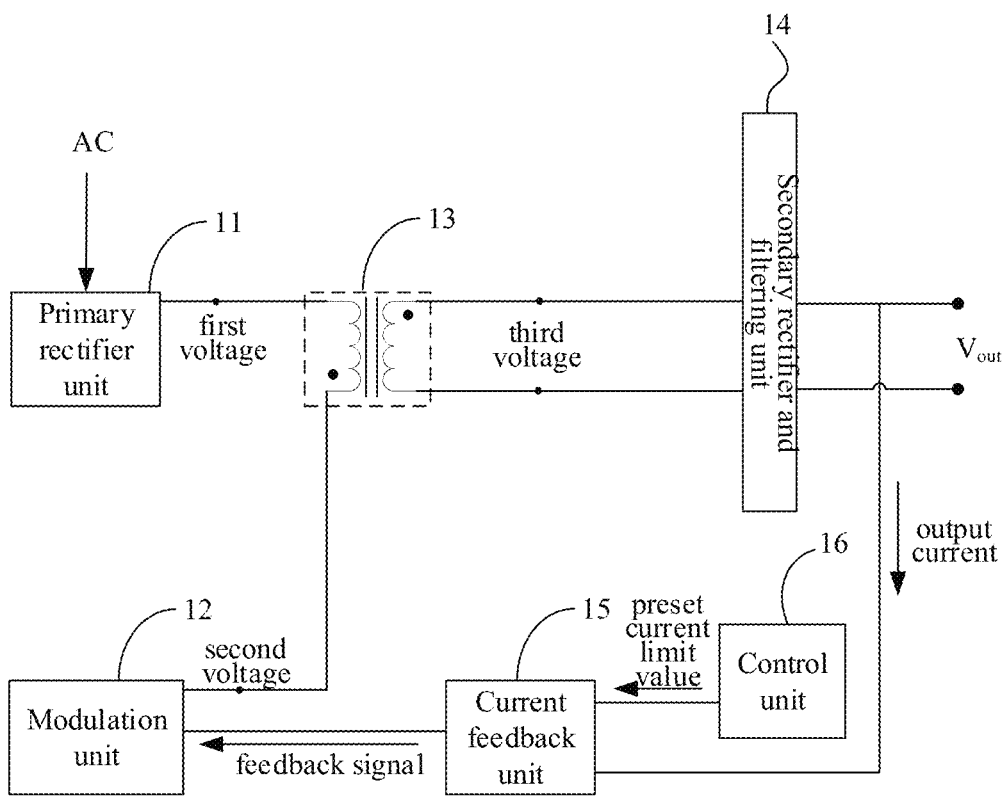
FIG. 1 is a schematic diagram of a power supply circuit according to an embodiment of the present disclosure.

As illustrated in FIG. 1, the power supply circuit 10 according to an embodiment of the present disclosure may include a primary rectifier unit 11, a modulation unit 12, a transformer 13, a secondary rectifier and filtering unit 14 and a current feedback unit 15. In the following, respective components of the power supply circuit 10 will be described in detail respectively.

The primary rectifier unit 11 may be configured to perform rectification on input alternating current to output a first voltage having a periodically changing voltage value. In some cases, the input alternating current (AC) may be referred to as mains supply. The input alternating current may be 220V alternating current, or may be 110V alternating current, which is not limited in embodiments of the present disclosure.

Figure 2:
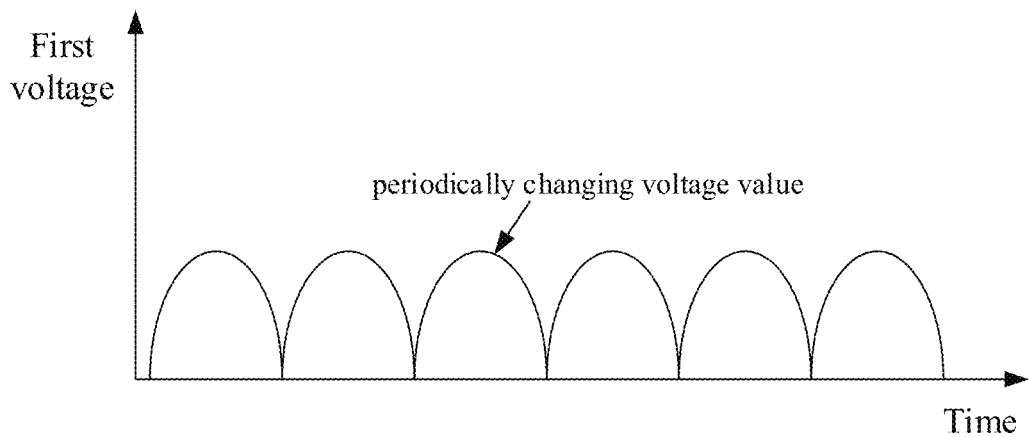
FIG. 2 is a schematic diagram illustrating a waveform of a first voltage to be modulated according to an embodiment of the present disclosure.

A voltage waveform of the first voltage is periodically changing. As illustrated in FIG. 2, the waveform of the first voltage may be a pulsating waveform or a steamed bun waveform.

Implementation of the primary rectifier unit 11 is not limited in embodiments of the present disclosure. The primary rectifier unit 11 may be a full-bridge rectifier circuit formed of four diodes, or may be a rectifier circuit in other forms, such as a half-bridge rectifier circuit.

The modulation unit 12 may be configured to modulate the first voltage to generate a second voltage. In some cases, the modulation unit 12 may be referred to as a chopper unit or a chopper. In other cases, the modulation unit 12 may be referred to as a clipper unit or a clipper. In embodiments of the present disclosure, implementation of the modulation unit 12 is not limited. As an example, the modulation unit 12 may module the first voltage in a PWM (Pulse Width Modulation) mode, or may modulate the first voltage in a frequency modulation mode.

Figure 3:
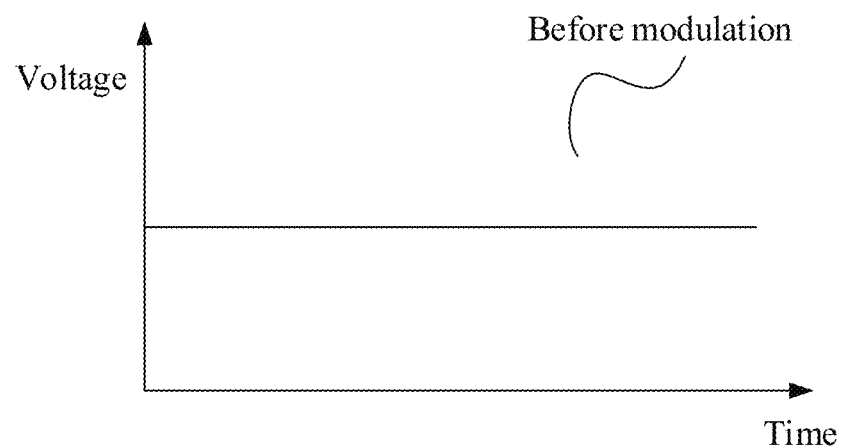
FIG. 3 is a schematic diagram comparing voltage waveforms before and after modulation of a conventional power supply circuit.
Figure 3:
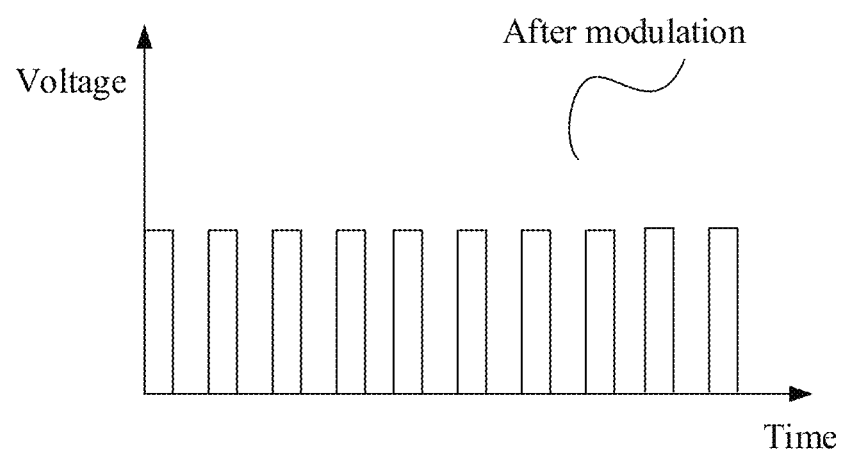

It should be noted that, in the related art, a voltage output from the primary rectifier unit 11 (corresponding to the first voltage in embodiments of the present disclosure) needs to be filtered by the primary filtering unit (including one or more liquid electrolytic capacitors) to form the constant direct current. A voltage waveform of the constant direct current is typically a straight line, i.e., the voltage waveform before modulation as illustrated in FIG. 3. Then, the modulation unit modulates the constant voltage (chops the waveform), to form the voltage after modulation as illustrated in FIG. 3. It can be seen from FIG. 3 that, with the processing of the modulation unit, the constant voltage signal is chopped into many small square wave pulse signals with same amplitude.

Figure 4:
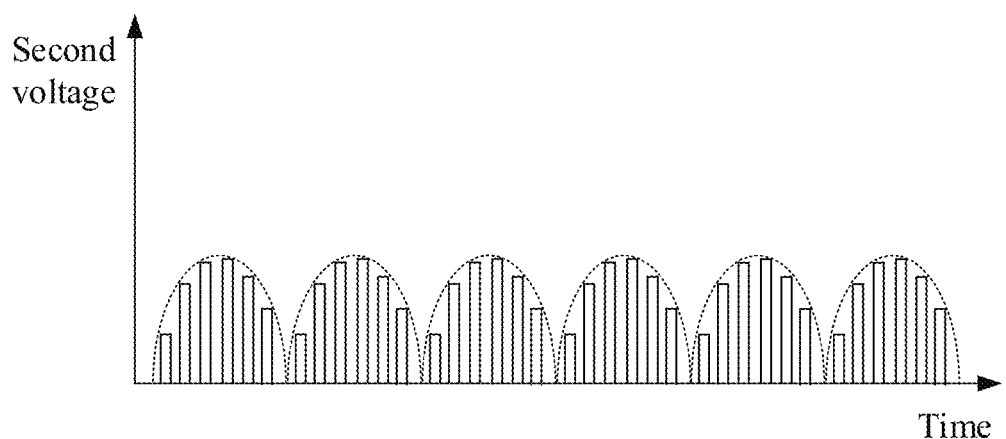
FIG. 4 is a schematic diagram illustrating a waveform of a second voltage obtained after modulating a first voltage according to an embodiment of the present disclosure.

In contrast, the power supply circuit provided by embodiments of the present disclosure removes the liquid electrolytic capacitor for primary filtering, and directly modulates the first voltage having the periodically changing voltage value after the primary rectification. Taking the waveform of the first voltage illustrated in FIG. 2 as an example, the waveform of the second voltage obtained after the modulation may be as illustrated in FIG. 4. It can be seen from FIG. 4 that, the second voltage also contains may small pulse signals, however, amplitudes of these pulse signals are not identical and change periodically. The dashed line in FIG. 4 indicates an envelope of pulse signals forming the second voltage. Compared with FIG. 2, the envelope of pulse signals forming the second voltage is substantially same as the waveform of the first voltage.

The transformer 13 may be configured to generate a third voltage based on the second voltage. In other words, the transformer 13 may be configured to couple the second voltage from the primary side of the transformer 13 to the secondary side of the transformer 13, to obtain the third voltage. For example, the transformer 13 may be configured to perform voltage transformation related operation on the second voltage to obtain the third voltage. The transformer 13 may be a common transformer, or may be a high-frequency transformer of which a working frequency ranges from 50 KHz to 2 MHz. The transformer 13 may include a primary winding and a secondary winding. Forms of the primary winding and the secondary winding, and connection modes between the primary winding and secondary winding and other units in the power supply circuit 10 are related to types of a switching power supply used by the power supply circuit. For example, the power supply circuit 10 may be based on a flyback switching power supply, a forward switching power supply, or a push-pull switching power supply. With different types of the switching power supply on which the power supply circuit is based, the specific forms and the connection modes of the primary winding and the secondary winding of the transformer may be different, which is not limited in embodiments of the present disclosure. FIG. 1 merely illustrates one possible connection mode of the transformer 13.

The secondary rectifier and filtering unit 14 may be configured to perform rectification and filtering on the third voltage to generate an output voltage and an output current of the power supply circuit 10. The secondary rectifier and filtering unit 14 may include a secondary rectifier unit and a secondary filtering unit. The filtering mode of the secondary filtering unit is not limited in embodiments of the present disclosure. As an example, the secondary filtering unit 14 may adopt a SR (synchronous rectifier) chip to perform synchronous rectification on the voltage (or current) induced by the secondary winding of the transformer. As another example, the secondary filtering unit may adopt a diode to perform secondary rectification. The secondary filtering unit may be configured to perform secondary filtering on the voltage after the secondary rectification. The secondary filtering unit may include one or more solid capacitors, or may include a combination of solid capacitors and common capacitors (such as, ceramic capacitors).

It can be seen from the above description that, in the power supply circuit 10 provided by embodiments of the present disclosure, the liquid electrolytic capacitor at the primary side is removed, such that the volume of the power supply circuit is reduced, and the service life and safety of the power supply circuit is improved.

The current feedback unit 15 may be configured to receive the output current of the power supply circuit 10, and to send a feedback signal to the modulation unit when a current value of the output current reaches a preset current limit value.

The modulation unit 12 may perform the procedure of modulating the first voltage to generate the second voltage according to the feedback signal, to limit the current value of the output current below the current limit value.

Taking the modulation unit 12 being based on a PWM controller as an example, the procedure of the modulation unit 12 modulating the first voltage to generate the second voltage is illustrated as follows. When the power supply circuit 10 just starts working, the output current of the power supply circuit 10 is relatively small. In this case, the modulation unit 12 may module the first voltage by continuously increasing a duty ratio of a PWM control signal, to generate the second voltage, such that the power supply circuit 10 may draw more energy from the input alternating current in unit time, thus continuously increasing the output current of the power supply circuit 10. When the output current of the power supply circuit 10 reaches the current limit value of the current feedback unit 15, the modulation unit 12 receives the feedback signal sent by the current feedback unit 15. In this case, the modulation unit 12 may modulate the first voltage by controlling the duty ratio of the PWM control signal to keep unchanged, to generate the second voltage, such that the output current of the power supply circuit 10 does not exceed the current limit value.

As an example, the current feedback unit 15 may include a current sampling unit and an operational amplifier. The current sampling unit may be configured to sample the output current of the power supply circuit 10, and to transmit the sampling voltage corresponding to the output current of the power supply circuit 10 to a negative input end of the operational amplifier. A voltage at a positive end of the current feedback unit 15 is a reference voltage. A voltage value of the reference voltage decides the current limit value of the current feedback unit 15. Therefore, the current limit value of the current feedback unit 15 may be adjusted by adjusting the voltage at the positive end of the current feedback unit 15.

The current feedback unit 15 may be directly coupled to the modulation unit 12, or may be indirectly coupled to the modulation unit 12 via an optocoupler, which is not limited in embodiments of the present disclosure. When the current feedback unit 15 is directly coupled to the modulation unit 12 via the optocoupler, the feedback signal sent by the current feedback unit 15 to the modulation unit needs to be first optic-electric converted by the optocoupler.

The power supply circuit 10 provided by embodiments of the present disclosure removes the liquid electrolytic capacitor at the primary side, and the capacitor (such as solid capacitor) in the secondary rectifier and filtering unit 14 has a weak ability in outputting direct current, and thus it is easy to occur overload (when the overload occurs, the output current of the power supply circuit 10 increases significantly). Therefore, there is a need to monitor the output current of the power supply circuit 10 in real time by using the current feedback unit 15, to limit the current value of the output current below the set current limit value all the time, avoiding the overload.

The input alternating current (mains supply) received by the first rectifier unit may be of different voltage types, for example, may be 220V alternating current, or may be 110V alternating current. The higher the voltage of the alternating current is, the more energy the power supply circuit can draw from the alternating current in unit time, and accordingly, the higher the direct current capability of the power supply circuit 10 is. Therefore, during charging the device to be charged with the constant direct current, the power supply circuit 10 may set corresponding current limit value for the current feedback unit 15 according to the voltage type of the alternating current.

In detail, the power supply circuit may further include a control unit 16. The control unit 16 may be an MCU (micro-control unit). The control unit may control other units in the power supply circuit 10 by sending control signals to the other units in the power supply circuit 10. The control unit 16 may be configured to determine the voltage of the alternating current. when the voltage of the alternating current is of a first type, the control unit 16 may set the current limit value of the current feedback unit 15 as a first current value. When the voltage of the alternating current is of a second type, the control unit 16 may set the current limit value of the current feedback unit 15 as a second current value. An amplitude (or valid value) of the voltage of the first type is greater than that of the voltage of the second type, and the first current value is greater than the second current value. In other words, the higher the amplitude (or valid value) of the voltage of the alternating current is, the stronger the direct current capability of the power supply circuit 10 is, and in this case, a higher current limit value is set by the control unit 16 for the current feedback unit 15 in embodiments of the present disclosure, such that the power supply circuit 10 may work in a wider current range. The lower the amplitude (or valid value) of the voltage of the alternating current is, the weaker the direct current capability of the power supply circuit 10 is, and in this case, a lower current limit value is set by the control unit 16 for the current feedback unit 15 in embodiments of the present disclosure, such that safety of the charging process is ensured.

The control unit 16 may adjust the current limit value of the current feedback unit 15 in various ways. for example, the control unit 16 may be coupled to a positive input end of the operational amplifier in the current feedback unit 15 and the control unit 16 may adjust the current limit value of the current feedback unit 15 by adjusting the reference voltage received by the positive input end.

It should be understood that, the first current value and the second current value may be calculated according to the direct current output capability reachable by the power supply circuit 10 under the first type of alternating current and the second type of alternating current. For example, after system design is completed, the direct current output capability reachable by the power supply circuit 10 under the first type of alternating current and the second type of alternating current may be measured, thus calculating the first current value and the second current value.

In embodiments of the present disclosure, the way in which the control unit 16 determines the voltage type of the alternating current is not limited. For example, the type (or size) of the alternating current may be determined according to the first voltage outputted by the primary rectifier unit 11, or the type (or size) of the alternating current may be determined according to the third voltage received by the secondary rectifier and filtering unit 14. The ways for determining the voltage type of the alternating current will be illustrated in detail below with specific embodiments.

Figure 5:
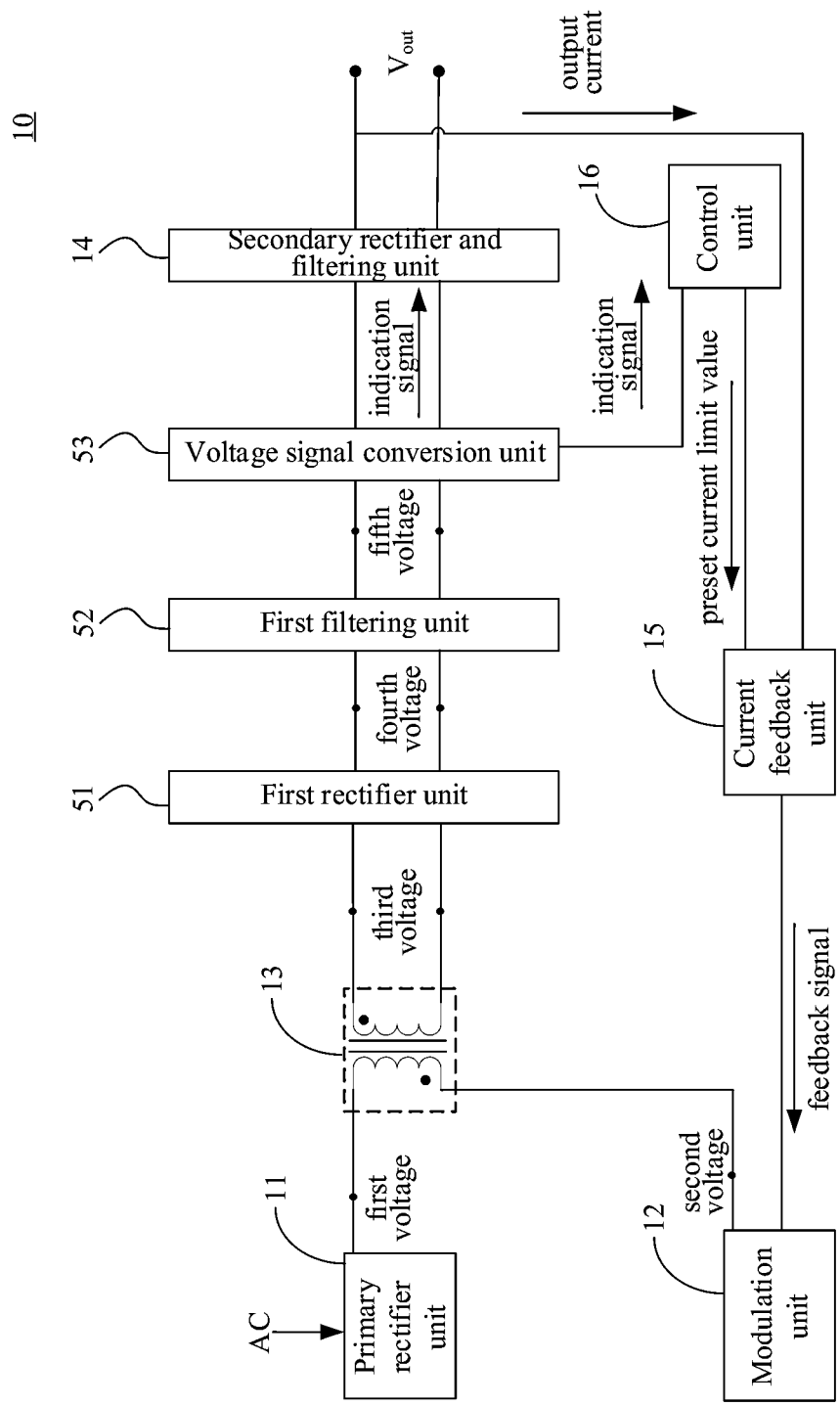
FIG. 5 is a schematic diagram of a power supply circuit according to another embodiment of the present disclosure.

In some embodiments, as illustrated in FIG. 5, the power supply circuit 10 may further include a first rectifier unit 51, a first filtering unit 52 and a voltage signal conversion unit 53. The first rectifier unit 51 may be configured to receive the third voltage, and to perform rectification on the third voltage to obtain a fourth voltage. The first filtering unit 52 may be configured to receive the fourth voltage, and to perform filtering on the fourth voltage to obtain a fifth voltage. The voltage signal conversion unit 53 may be configured to convert the fifth voltage to an indication signal for indicating the voltage type of the alternating current. The control unit 16 may be configured to receive the indication signal, and to determine the voltage type of the alternating current according to the indication signal.

It should be understood that, after the rectification of the first rectifier unit and the filtering of the first filtering unit 52, the voltage value of the fifth voltage is in positive proportion to the valid value (220V or 110V) or the amplitude of the input alternating current. In some embodiments, the fifth voltage may also be referred to as a forward voltage. In embodiments of the present disclosure, the voltage type of the alternating current may be determined by using the fifth voltage. Several specific determining ways are illustrated as follows.

Figure 6:
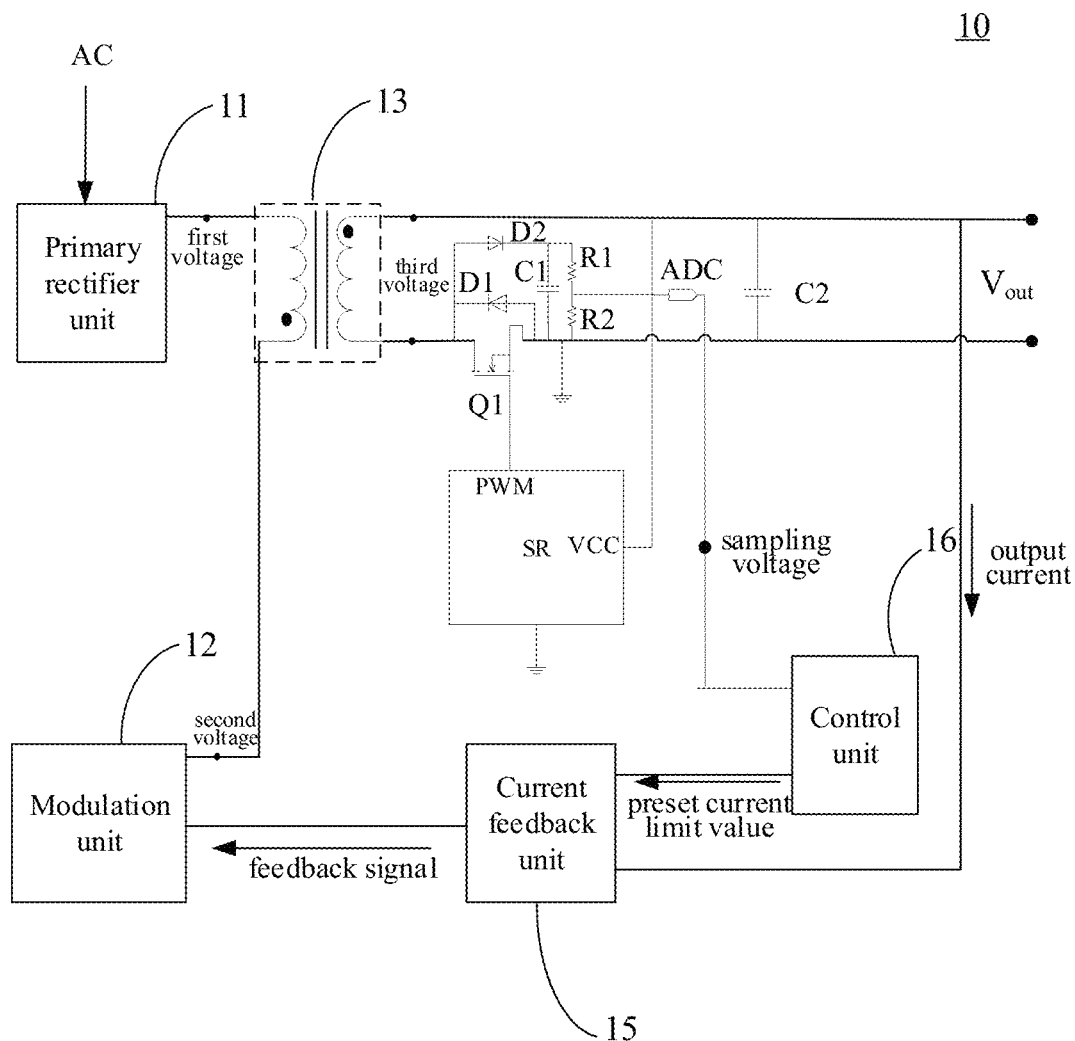
FIG. 6 is a schematic diagram of a power supply circuit according to yet another embodiment of the present disclosure.

As an example, the voltage signal conversion unit 53 may be configured to sample the fifth voltage. Accordingly, the indication signal outputted by the voltage signal conversion unit 53 may be a sampling voltage of the fifth voltage. Taking FIG. 6 as an example, the secondary rectifier and filtering unit 14 may include a secondary synchronous rectification unit mainly consisting of a SR chip for synchronous rectification, a switch tube Q1 and a diode D1, and a secondary filtering unit mainly consisting of a capacitor C2. The first rectifier unit 51 may be implemented by the diode D2 in FIG. 6, and configured to perform rectification on the third voltage outputted by a secondary winding of the transformer 13 to obtain the fourth voltage. The first filtering unit 52 may be implemented by the capacitor C1 in FIG. 6, and configured to perform filtering on the fourth voltage outputted by the diode D2 to obtain the fifth voltage. The voltage signal conversion unit 53 may be implemented by the resistor R1 and the resistor R2 in FIG. 6, and configured to sample the voltage signal to obtain the sampling voltage. The sampling voltage may be configured to represent a size of the fifth voltage. Since the fifth voltage is in positive proportion to the valid value (or amplitude) of the voltage of the alternating current, the sampling voltage may be configured to represent the valid value (or amplitude) of the voltage of the alternating current, and thus represent the voltage type of the alternating current. For example, the sampling voltage may be configured to represent whether the input alternating current is 220V alternating current or 110V alternating current. The control unit 16 may be configured to receive the sampling voltage, and to determine the voltage type of the alternating current according to the sampling voltage. As illustrated in FIG. 6, the control unit 16, for example, may be coupled to a node between the resistor R1 and the resistor R2 via an ADC (analog-to-digital converter), to obtain the sampling voltage.

As another example, the voltage signal conversion unit 53 may be configured to determine the voltage type of the alternating current according to the fifth voltage, and to generate the indication signal according to the determined voltage type of the alternating current. The indication signal is one of a high level and a low level. When the indication signal is the high level, the indication signal is configured to indicate that the voltage of the alternating current is of the first type, and when the indication signal is the low level, the indication signal is configured to indicate that the voltage of the alternating current is of the second type. Or, when the indication signal is the high level, the indication signal is configured to indicate that the voltage of the alternating current is of the second type, and when the indication signal is the low level, the indication signal is configured to indicate that the voltage of the alternating current is of the first type.

In embodiments of the present disclosure, the high level or the low level is generated according to the fifth voltage, to indicate the voltage type of the alternating current, which may simplify the determining logic of the control unit 16.

One implementation in which the voltage signal conversion unit 53 converts the fifth voltage to the high level or the low level is illustrated below with reference to FIG. 7.

Figure 7:
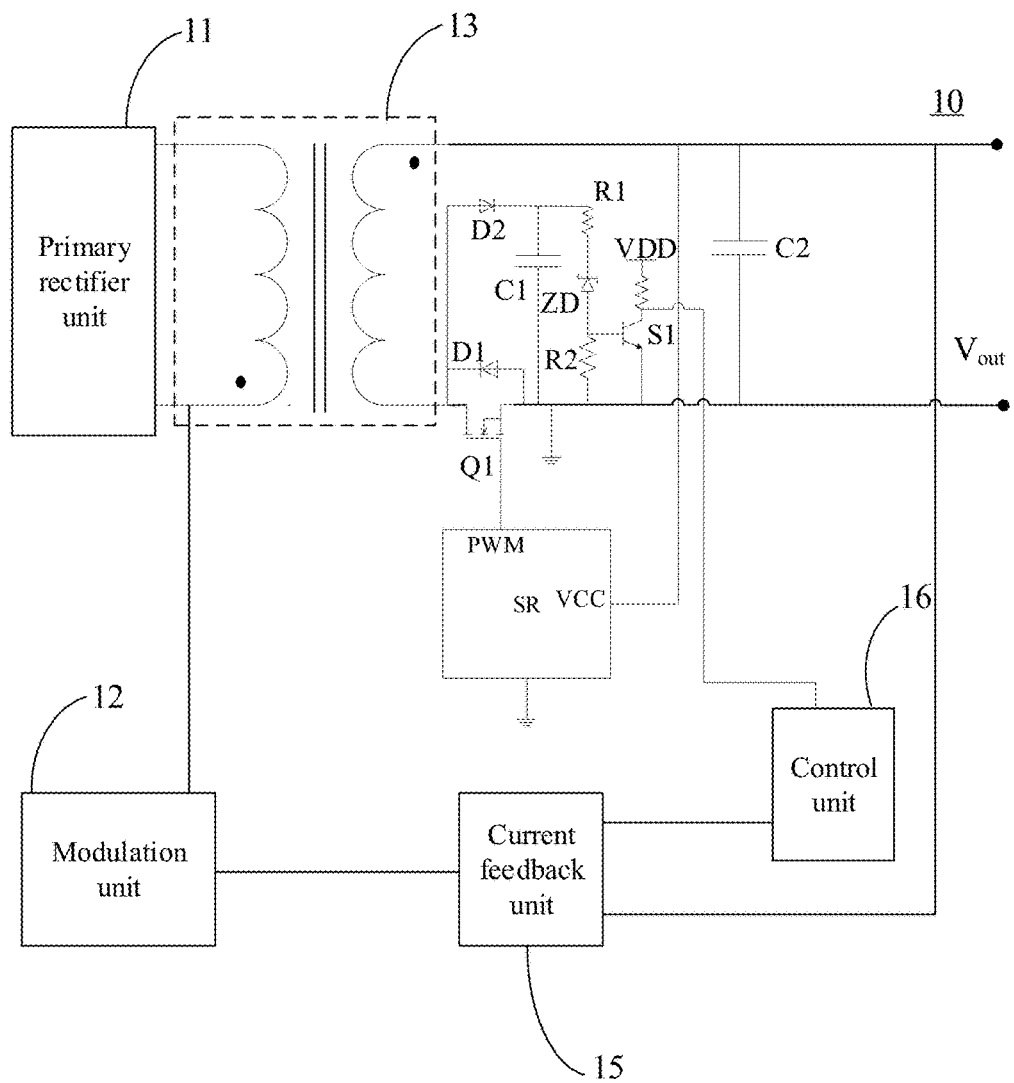
FIG. 7 is a schematic diagram of a power supply circuit according to still another embodiment of the present disclosure.

As illustrated in FIG. 7, the voltage signal conversion unit 53 includes a voltage-stabilizing tube ZD and a triode s1. The voltage-stabilizing tube ZD may be configured such that, when the voltage of the alternating current is of the first type, both the voltage-stabilizing tube ZD and the triode s1 are switched on, and a collector of the triode s1 is at the low level, and when the voltage of the alternating current if of the second type, both the voltage-stabilizing tube ZD and the triode s1 are switched off, and the collector of the triode s1 is at the high level. The control unit 16 may be coupled to the collector of the triode s1, and use the voltage signal at the collector as the indication signal for indicating the voltage type of the alternating current.

For example, when the input alternating current is 220V alternating current, the voltage dividing among the resistor R1, the voltage-stabilizing tube ZD and the resistor R2 makes the voltage-stabilizing tube ZD occur avalanche and switched on, a higher voltage is received at a gate of the triode s1, controlling the triode s1 to switch on. In this case, the voltage of the collector of the triode s1 is the low level, indicating that the alternating current is the 220V alternating current. when the input alternating current is 110V alternating current, the voltage dividing among the resistor R1, the voltage-stabilizing tube ZD and the resistor R2 makes the voltage-stabilizing tube ZD switched off, the voltage at the gate of the triode s1 is the low level, controlling the triode s1 to switch off. In this case, the voltage of the collector of the triode s1 is the high level, indicating that the alternating current is the 110V alternating current.

It should be noted that, FIG. 7 merely illustrates an example of implementation of the voltage signal conversion unit 53. In practice, the functions of the voltage signal conversion unit 53 may be implemented by other elements, such as a comparator.

In the related art, a power supply circuit for charging the device to be charged is proposed. This power supply circuit operates in a constant voltage mode. In the constant voltage mode, the output voltage of this power supply circuit keeps substantially constant, for example, 5V, 9V, 12V or 20V.

The output voltage of the power supply circuit is not suitable for being directly applied to both ends of the battery. Instead, the output voltage of the power supply circuit needs to be converted by a conversion circuit in the device to be charged, such that a charging voltage and/or a charging current expected by the battery in the device to be charged is obtained.

The conversion circuit is configured to convert the output voltage of the power supply circuit, to meet a requirement of the charging voltage and/or charging current expected by the battery.

As an example, the conversion circuit may be a charging management module, such as a charging integrated circuit (IC). During a charging process of the battery, the conversion circuit may be configured to manage the charging voltage and/or charging current of the battery. The conversion circuit may have at least one of a voltage feedback function and a current feedback function, so as to manage the charging voltage and/or charging current of the battery.

For example, the charging process of the battery may include at least one of a trickle charging stage, a constant current charging stage and a constant voltage charging stage. In the trickle charging stage, the conversion circuit may utilize a current feedback loop to ensure that a current flowing into the battery in the trickle charging stage meets the charging current (such as a first charging current) expected by the battery. In the constant current charging stage, the conversion circuit may utilize a current feedback loop to ensure that the current flowing into the battery in the constant current charging stage meets the charging current (such as a second charging current, which may be greater than the first charging current) expected by the battery. In the constant voltage charging stage, the conversion circuit may utilize a voltage feedback loop to ensure that a voltage applied to both ends of the battery in the constant voltage charging stage meets the charging voltage expected by the battery.

As an example, when the output voltage of the power supply circuit is greater than the charging voltage expected by the battery, the conversion circuit may be configured to perform a buck conversion on the output voltage of the power supply circuit to enable a buck-converted charging voltage to meet the requirement of the charging voltage expected by the battery. As another example, when the output voltage of the power supply circuit is less than the charging voltage expected by the battery, the conversion circuit may be configured to perform a boost conversion on the output voltage of the power supply circuit to enable a boost-converted charging voltage to meet the requirement of the charging voltage expected by the battery.

As another example, assume that the power supply circuit outputs a constant voltage of 5V. When the battery includes a single battery cell (such as a lithium battery cell, a charging cut-off voltage of a single battery cell is typically 4.2V), the conversion circuit (for example, a buck circuit) may perform a buck conversion on the output voltage of the power supply circuit, such that the charging voltage obtained after the buck conversion meets a requirement of the charging voltage expected by the battery.

As yet another example, assume that the power supply circuit outputs a constant voltage of 5V. When the power supply circuit charges a plurality of (two or more) battery cells (such as lithium battery cell, a charging cut-off voltage of a single battery cell is typically 4.2V) coupled in series, the conversion circuit (for example, a boost circuit) may perform a boost conversion on the output voltage of the power supply circuit, such that the charging voltage obtained after the boost conversion meets a requirement of the charging voltage expected by the battery.

Limited by a poor conversion efficiency of the conversion circuit, a part of electric energy is lost in a form of heat, and the heat may gather inside the device to be charged. A design space and a space for heat dissipation of the device to be charged are small (for example, the physical size of a mobile terminal used by a user becomes thinner and thinner, while plenty of electronic elements are densely arranged in the mobile terminal to improve performance of the mobile terminal), which not only increases difficulty in designing the conversion circuit, but also results in that it is hard to dissipate the heat gathered in the device to be charged, thus further causing an abnormality of the device to be charged.

For example, the heat gathered on the conversion circuit may cause a thermal interference on electronic elements neighboring the conversion circuit, thus causing abnormal operations of the electronic elements; and/or for another example, the heat gathered on the conversion circuit may shorten the service life of the conversion circuit and neighboring electronic elements; and/or for yet another example, the heat gathered on the conversion circuit may cause a thermal interference on the battery, thus causing abnormal charging and/or abnormal discharging of the battery; and/or for still another example, the heat gathered on the conversion circuit may increase the temperature of the device to be charged, thus affecting user experience during the charging; and/or for still yet another example, the heat gathered on the conversion circuit may short-circuit the conversion circuit, such that the output voltage of the power supply circuit is directly applied to both ends of the battery, thus causing abnormal charging of the battery, which brings safety hazard if the over-voltage charging lasts for a long time, for example, the battery may explode.

Embodiments of the present disclosure further provide a power supply circuit 10. The control unit 16 in the power supply circuit 10 may be configured to communicate with the device to be charged, to adjust an output power of the power supply circuit 10, such that the output voltage and/or the output current of the power supply circuit 10 matches a charging stage where the battery in the device to be charged is currently.

It should be understood that, the charging stage where the battery is currently may include at least one of a trickle charging stage, a constant current charging stage and a constant voltage charging stage.

Taking the charging stage where the battery is currently being the constant voltage charging stage as an example, communicating with the device to be charged, to adjust the output power of the power supply circuit, such that the output voltage and/or the output current of the power supply circuit matches the charging stage where the battery in the device to be charged is currently, includes: in the constant voltage charging stage, communicating with the device to be charged, to adjust the output power of the power supply circuit, such that the output voltage of the power supply circuit matches the charging voltage corresponding to the constant voltage charging stage.

Taking the charging stage where the battery is currently being the constant current charging stage as an example, communicating with the device to be charged, to adjust the output power of the power supply circuit, such that the output voltage and/or the output current of the power supply circuit matches the charging stage where the battery in the device to be charged is currently, includes: in the constant current charging stage, communicating with the device to be charged, to adjust the output power of the power supply circuit, such that the output current of the power supply circuit matches the charging current corresponding to the constant current charging stage.

The power supply circuit 10 having communication function provided by embodiments of the present disclosure will be illustrated in detail below.

The power supply circuit 10 may obtain status information of the battery. The status information of the battery may include present electric quantity information and/or voltage information of the battery. The power supply circuit 10 may adjust the output voltage of the power supply circuit 10 itself according to the obtained status information of the battery, to meet the requirement of the charging voltage and/or charging current expected by the battery. The voltage outputted by the power supply circuit 10 after adjustment may be directly applied to both ends of the battery for charging the battery (hereinafter, referred to as "direct charging"). Further, during the constant current charging stage of the process of charging the battery, the voltage outputted by the power supply circuit 10 after adjustment may be directly applied to both ends of the battery for charging the battery.

The power supply circuit 10 may have a voltage feedback function and a current feedback function, so as to manage the charging voltage and/or charging current of the battery.

The power supply circuit 10 adjusting the output voltage of the power supply circuit 10 itself according to the obtained status information of the battery may mean that, the power supply circuit 10 may obtain the status information of the battery in real time, and adjust the output voltage of the power supply circuit 10 itself according to the obtained real-time status information of the battery, to meet the charging voltage and/or charging current expected by the battery.

The power supply circuit 10 adjusting the output voltage of the power supply circuit 10 itself according to the obtained real-time status information of the battery may mean that, as the voltage of the battery continuously increases during the charging process, the power supply circuit 10 may obtain the present status information of the battery at different time points in the charging process, and adjust the output voltage of the power supply circuit 10 itself in real time according to the present status information of the battery, to meet the requirement of the charging voltage and/or charging current expected by the battery.

For example, the charging process of the battery may include at least one of a trickle charging stage, a constant current charging stage and a constant voltage charging stage. In the trickle charging stage, the power supply circuit 10 may output a first charging current in the trickle charging stage to charge the battery, so as to meet the requirement of the charging current expected by the battery (the first charging current may be the constant direct current). In the constant current charging stage, the power supply circuit 10 may utilize a current feedback loop to ensure that the current outputted by the power supply circuit 10 and flowing into the battery in the constant current charging stage meets the requirement of the charging current expected by the battery (such as a second charging current, which may also be a current with a pulsating waveform, and may be greater than the first charging current, which may mean that, a peak value of the current with the pulsating waveform in the constant current charging stage is greater than that of the current with the pulsating waveform in the trickle charging stage, while "constant current" of the constant current charging stage means that, in the constant current charging stage, a peak value or a mean value of the current with the pulsating waveform is basically constant). In the constant voltage charging stage, the power supply circuit 10 may utilize a voltage feedback loop to ensure that a voltage outputted from the power supply circuit 10 to the device to be charged in the constant voltage charging stage (i.e., the constant direct voltage) keeps constant.

For example, the power supply circuit 10 mentioned in embodiments of the present disclosure may be mainly configured to control the constant current charging stage of the battery in the device to be charged. In other embodiments, controlling the trickle charging stage and the constant voltage charging stage of the battery in the device to be charged may also be completed cooperatively by the power supply circuit 10 and an additional charging chip in the device to be charged. Compared to that in the constant current charging stage, the charging power accepted by the battery in the trickle charging stage and the constant voltage charging stage is less, and the efficiency conversion loss and the heat accumulation of the charging chip in the device to be charged is acceptable.

It should be noted that, the constant current charging stage or the constant current stage mentioned in embodiments of the present disclosure may refer to a charging mode in which the output current of the power supply circuit 10 is controlled, and does not require the output current of the power supply circuit 10 to keep completely constant and unchanged. For example, the constant current may refer to that, a peak value or a mean value of the current with the pulsating waveform outputted by the power adapter is basically constant, or keeps constant during a certain time period. For example, in practice, the power supply circuit 10 typically performs charging by means of multi-stage constant current charging in the constant current charging stage.

The multi-stage constant current charging may include N constant current stages, where N is an integer no less than 2. The first charging stage of the multi-stage constant current charging starts with a predetermined charging current. N constant current stages in the multi-stage constant current charging are performed in sequence from the first charging stage to the $(N-1)^{th}$ charging stage. After the constant current charging is switched from one constant current stage to the next constant current stage, the peak value of the current may be decreased. When the battery voltage reaches a charging stop voltage threshold, the constant current charging is switched from the present constant current stage to the next constant current stage. The current change between two adjacent constant current stages may be gradual, or may be in a stepped skip manner.

Further, in a case where the output current of the power supply circuit 10 is the current having the current value periodically changing (such as the pulsating direct current), the constant current mode may refer to a charging mode in which the peak value or the mean value of the current periodically changing is controlled, i.e., the peak value of the output current of the power supply circuit 10 is controlled to not exceed the current corresponding to the constant current mode. Moreover, in a case where the output current of the power supply circuit 10 is the alternating current, the constant current mode refers to a charging mode in which the peak value of the alternating current is controlled.

In some embodiments, the power supply circuit 10 supports a first charging mode and a second charging mode, and a charging speed of the power supply circuit 10 charging the battery in the second charging mode is greater than a charging mode of the power supply circuit 10 charging the battery in the first charging mode. In other words, compared to the power supply circuit 10 working in the first charging mode, the power supply circuit 10 working in the second charging mode may take a shorter time to fully charge the battery with a same capacity. Further, in some embodiments, in the first charging mode, the power supply circuit 10 charges the battery via a second charging channel, and in the second charging mode, the power supply circuit 10 charges the battery via a first charging channel.

The first charging mode may be a normal charging mode, and the second charging mode may be a fast charging mode. The normal charging mode may refer to a charging mode in which the power supply circuit 10 outputs a relatively smaller current value (typically less than 2.5 A) or charges the battery in the device to be charged with a relatively smaller power (typically less than 15). In the normal charging mode, it typically takes several hours to fully fill a larger capacity battery (such as a battery with 3000 mAh). However, in the fast charging mode, the power supply circuit 10 can output a relatively large current (typically greater than 2.5 A, such as 4.5 A, 5 A or higher) or charges the battery in the device to be charged with a relatively large power (typically greater than or equal to 15 W). Compared to the normal charging mode, the period of time may be significantly shortened when the battery with the same capacity is fully filled by the power supply circuit 10 in the fast charging mode, and the charging is faster.

As indicated above, the output current of the power supply circuit 10 may have the waveform with the current value periodically changing. The waveform may refer to the waveform of the output current of the power supply circuit 10 working in the second charging mode. In the first charging mode, the voltage value of the output voltage of the power supply circuit 10 is constant, and the waveform of the output current varies with the load.

Further, the device to be charged may perform bidirectional communication with the power supply circuit 10 (or the control unit 16 in the power supply circuit 10), to control the output of the power supply circuit 10 in the second charging mode (i.e., control the charging voltage and/or the charging current provided by the power supply circuit 10 in the second charging mode). The device to be charged may include a charging interface, and the device to be charged may communicate with the power supply circuit 10 via a data wire of the charging interface. Taking the charging interface being a USB interface as an example, the data wire may be a D+ wire and/or a D− wire of the USB interface. Or, the device to be charged may perform wireless communication with the power supply circuit 10.

The communicated content between the power supply circuit 10 and the device to be charged is not limited in embodiments of the present disclosure, and the control method of the device to be charged on the output of the power supply circuit 10 in the second charging mode is also not limited in embodiments of the present disclosure. For example, the device to be charged may communicate with the power supply circuit 10 to obtain the present voltage or present electric quantity of the battery in the device to be charged, and adjust the output voltage or output current of the power supply circuit 10 based on the present voltage or present electric quantity of the battery. In the following, the communicated content between the power supply circuit 10 and the device to be charged and the control method of the device to be charged on the output of the power supply circuit 10 in the second charging mode will be described in detail in combination with specific embodiments.

The master-slave relation of the power supply circuit 10 and the device to be charged is not limited in embodiments of the present disclosure. In other words, any of the power supply circuit 10 and the device to be charged can be configured as the master device for initiating the bidirectional communication session, accordingly, the other one can be configured as the slave device for making a first response or a first reply to the communication initiated by the master device. As a feasible implementation, during the communication, the identities of the master device and the slave device can be determined by comparing the electrical levels of the power supply circuit 10 and the device to be charged relative to the ground.

The specific implementation of bidirectional communication between the power supply circuit 10 and the device to be charged is not limited in embodiments of the present disclosure. In other words, any of the power supply circuit 10 and the device to be charged can be configured as the master device for initiating the communication session, accordingly, the other one can be configured as the slave device making a first response or a first reply to the communication session initiated by the master device, and the master device is able to make a second response to the first response or the first reply of the slave device, and thus a negotiation about a charging mode can be realized between the master device and the slave device. As a feasible implementation, a charging operation between the master device and the slave device is performed after a plurality of negotiations about the charging mode are completed between the master device and the slave device, such that the charging process can be performed safely and reliably after the negotiation.

As an implementation, the mater device is able to make a second response to the first response or the first reply made by the slave device to the communication session in a manner that, the master device is able to receive the first response or the first reply made by the slave device to the communication session and to make a targeted second response to the first response or the first reply. As an example, when the master device receives the first response or the first reply made by the slave device to the communication session in a predetermined time period, the master device makes the targeted second response to the first response or the first reply of the slave device in a manner that, the master device and the slave device complete one negotiation about the charging mode, and a charging process may be performed between the master device and the salve device in the first charging mode or the second charging mode, i.e., the power supply circuit 10 charges the device to be charged in the first charging mode or the second charging mode according to a negotiation result.

As another implementation, the mater device is able to make a second response to the first response or the first reply made by the slave device to the communication session in a manner that, when the master device does not receive the first response or the first reply made by the slave device to the communication session in the predetermined time period, the mater device also makes the targeted second response to the first response or the first reply of the slave device. As an example, when the master device does not receive the first response or the first reply made by the slave device to the communication session in the predetermined time period, the mater device makes the targeted second response to the first response or the first reply of the slave device in a manner that, the master device and the slave device complete one negotiation about the charging mode, and the charging process is performed between the mater device and the slave device in the first charging mode, i.e., the power supply circuit 10 charges the device to be charged in the first charging mode.

In some embodiments, when the device to be charged is configured as the mater device for initiating the communication session, after the power supply circuit 10 configured as the slave device makes the first response or the first reply to the communication session initiated by the master device, it is unnecessary for the device to be charged to make the targeted second response to the first response or the first reply of the power supply circuit 10, i.e., one negotiation about the charging mode is regarded as completed between the power supply circuit 10 and the device to be charged, and the power supply circuit 10 is able to charge the device to be charged in the first charging mode or the second charging mode according to the negotiation result.

In some embodiments, the device to be charged may perform bidirectional communication with the power supply circuit 10 to control the output of the power supply circuit 10 in the second charging mode as follows. The device to be charged performs the bidirectional communication with the power supply circuit 10 to negotiate the charging mode between the power supply circuit 10 and the device to be charged.

In some embodiments, the device to be charged may perform the bidirectional communication with the power supply circuit 10 to negotiate the charging mode between the power supply circuit 10 and the device to be charged as follows. The device to be charged receives a first instruction sent by the power supply circuit 10, in which the first instruction is configured to query the device to be charged whether to operate in the second charging mode. The device to be charged sends a reply instruction of the first instruction to the power supply circuit 10, in which the reply instruction of the first instruction is configured to indicate whether the device to be charged agrees to operate in the second charging mode. When the device to be charged agrees to operate in the second charging mode, the device to be charged controls the power supply circuit 10 to charge the battery via the first charging channel.

In some embodiments, the device to be charged may perform bidirectional communication with the power supply circuit 10 to control the output of the power supply circuit 10 in the second charging mode as follows. The device to be charged performs the bidirectional communication with the power supply circuit 10 to determine the charging voltage outputted by the power supply circuit 10 in the second charging mode for charging the device to be charged.

In some embodiments, the device to be charged may perform the bidirectional communication with the power supply circuit 10 to determine the charging voltage outputted by the power supply circuit 10 in the second charging mode for charging the device to be charged as follows. The device to be charged receives a second instruction sent by the power supply circuit 10, in which the second instruction is configured to query whether the output voltage of the power supply circuit 10 matches the present voltage of the battery in the device to be charged. The device to be charged sends a reply instruction of the second instruction to the power supply circuit 10, in which the reply instruction of the second instruction is configured to indicate that the output voltage of the power supply circuit 10 matches the present voltage of the battery, or is higher or lower than the present voltage of the battery. In some embodiments, the second instruction can be configured to query whether the present output voltage of the power supply circuit 10 is suitable for being used as the charging voltage outputted by the power supply circuit 10 in the second charging mode for charging the device to be charged, and the reply instruction of the second instruction can be configured to indicate the present output voltage of the power supply circuit 10 is suitable, high or low.

When the present output voltage of the power supply circuit 10 matches the present voltage of the battery or the present output voltage of the power supply circuit 10 is suitable for being used as the charging voltage outputted by the power supply circuit 10 in the second charging mode for charging the device to be charged, it indicates that the present output voltage of the power supply circuit 10 may be slightly higher than the present voltage of the battery, and a difference between the output voltage of the power supply circuit 10 and the present voltage of the battery is within a predetermined range (typically in an order of hundreds of millivolts). When the present output voltage of the power supply circuit 10 is higher than the present voltage of the battery, it indicates that the difference between the output voltage of the power supply circuit 10 and the present voltage of the battery is above the predetermined range. When the present output voltage of the power supply circuit 10 is lower than the present voltage of the battery, it indicates that the difference between the output voltage of the power supply circuit 10 and the present voltage of the battery is below the predetermined range.

In some embodiments, the device to be charged may perform the bidirectional communication with the power supply circuit 10 to control the output of the power supply circuit 10 in the second charging mode as follows. The device to be charged may perform the bidirectional communication with the power supply circuit 10 to determine the charging current outputted by the power supply circuit 10 in the second charging mode for charging the device to be charged In some embodiments, the device to be charged may perform the bidirectional communication with the power supply circuit 10 to determine the charging current outputted by the power supply circuit 10 in the second charging mode for charging the device to be charged as follows. The device to be charged receives a third instruction sent by the power supply circuit 10, in which the third instruction is configured to query a maximum charging current presently supported by the device to be charged. The device to be charged sends a reply instruction of the third instruction to the power supply circuit 10, in which the reply instruction of the third instruction is configured to indicate the maximum charging current presently supported by the device to be charged. The power supply circuit 10 determines the charging current outputted by the power supply circuit 10 in the second charging mode for charging the device to be charged according to the maximum charging current presently supported by the device to be charged.

The maximum charging current presently supported by the device to be charged may be derived according to the capacity of the battery of the device to be charged, a cell system, and the like, or may be a preset value.

It should be understood that, the device to be charged may determine the charging current outputted by the power supply circuit 10 in the second charging mode for charging the device to be charged according to the maximum charging current presently supported by the device to be charged in many ways. For example, the power supply circuit 10 may determine the maximum charging current presently supported by the device to be charged as the charging current outputted by the power supply circuit 10 in the second charging mode for charging the device to be charged, or may determine the charging current outputted by the power supply circuit 10 in the second charging mode for charging the device to be charged after comprehensively considering factors such as the maximum charging current presently supported by the device to be charged and its own current output capability.

In some embodiments, the device to be charged may perform the bidirectional communication with the power supply circuit 10 to control the output of the power supply circuit 10 in the second charging mode as follows. During charging in the second charging mode, the device to be charged performs the bidirectional communication with the power supply circuit 10 to adjust the output current of the power supply circuit 10.

In some embodiments, the device to be charged may perform the bidirectional communication with the power supply circuit 10 to adjust the output current of the power supply circuit 10 as follows. The device to be charged receives a fourth instruction sent by the power supply circuit 10, in which the fourth instruction is configured to query a present voltage of the battery in the device to be charged. The device to be charged sends a reply instruction of the fourth instruction to the power supply circuit 10, in which the reply instruction of the fourth instruction is configured to indicate the present voltage of the battery. The power supply circuit 10 adjusts the output current of the power supply circuit 10 according to the present voltage of the battery.

In some embodiments, the device to be charged may perform the bidirectional communication with the power supply circuit 10 to control the output of the power supply circuit 10 in the second charging mode as follows. The device to be charged performs the bidirectional communication with the power supply circuit 10 to determine whether the charging interface is in poor contact.

In an embodiment, the device to be charged may perform the bidirectional communication with the power supply circuit 10 to determine whether the charging interface is in poor contact as follows. The device to be charged receives the fourth instruction sent by the power supply circuit 10, in which the fourth instruction is configured to query the present voltage of the battery in the device to be charged. The device to be charged sends the reply instruction of the fourth instruction to the power supply circuit 10, in which the reply instruction of the fourth instruction is configured to indicate the present voltage of the battery in the device to be charged. The power supply circuit 10 determines whether the charging interface is in poor contact according to the output voltage of the power supply circuit 10 and the present voltage of the battery in the device to be charged. For example, when the power supply circuit 10 determines a difference between the output voltage of the power supply circuit 10 and the present voltage of the battery in the device to be charged is greater than a predetermined voltage threshold, it indicates that an impedance obtained by dividing the voltage difference by the present current value outputted by the power supply circuit 10 is greater than a preset impedance threshold, and thus it can be determined that the charging interface is in poor contact.

In some embodiments, it can be determined by the device to be charged whether the charging interface is in poor contact. For example, the device to be charged sends a sixth instruction to the power supply circuit 10, in which the sixth instruction is configured to query the output voltage of the power supply circuit 10. The device to be charged receives a reply instruction of the sixth instruction sent by the power supply circuit 10, in which the reply instruction of the sixth instruction is configured to indicate the output voltage of the power supply circuit 10. The device to be charged determines whether the charging interface is in poor contact according to the output voltage of the power supply circuit 10 and the present voltage of the battery in the device to be charged. After the device to be charged determines that the charging interface is in poor contact, the device to be charged may send a fifth instruction to the power supply circuit 10, in which the fifth instruction is configured to indicate that the charging interface is in poor contact. After receiving the fifth instruction, the power supply circuit 10 may quit the second charging mode.

Figure 8:
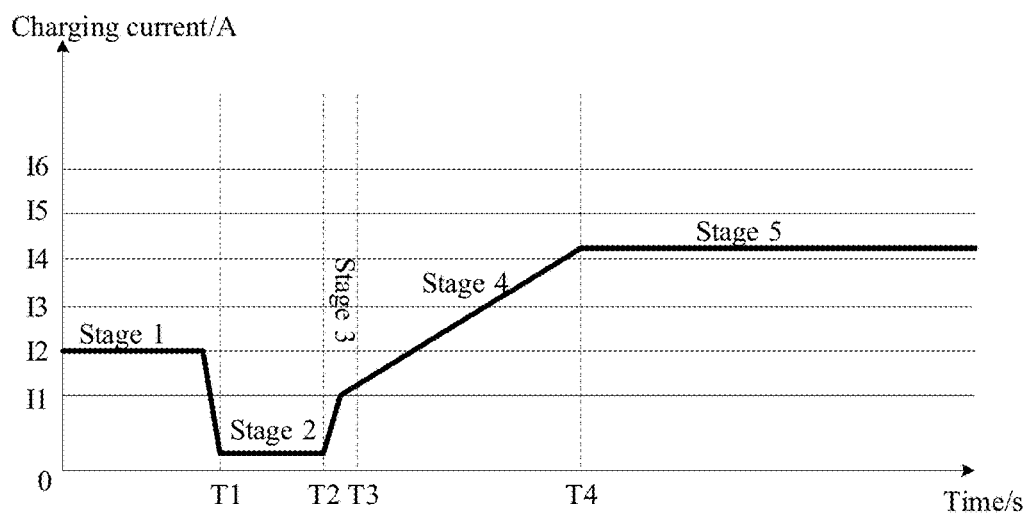
FIG. 8 is a schematic diagram illustrating a fast charging process according to an embodiment of the present disclosure.

With reference to FIG. 8, the communication procedure between the power supply circuit 10 and the device to be charged will be described in detail. It should be noted that, examples in FIG. 8 are merely used to help those skilled in the related art to understand embodiments of the present disclosure. The embodiments shall not be limited to the specific numeric values or specific scenes. Apparently, various modifications and equivalents can be made by those skilled in the related art based on examples in FIG. 8, and those modifications and equivalents shall fall within the protection scope of the present disclosure.

As illustrated in FIG. 8, the communication procedure between the power supply circuit 10 and the device to be charged (or, referred to as the communication procedure of the fast charging) may include the following five stages.

Stage 1:

After the device to be charged is coupled to the power supply circuit 10, the device to be charged may detect a type of the power supply circuit 10 via the data wires D+ and D−. When detecting that the power supply circuit 10 is a power supply circuit specifically used for charging, such as an adapter, the device to be charged may absorb current greater than a predetermined current threshold 12 (which may be, for example, 1 A). When the power supply circuit 10 detects that the output current of the power supply circuit 10 is greater than or equal to 12 for a predetermined time period (for example, may be a continuous time period T1), the power supply circuit 10 determines that the device to be charged has completed the recognition of the type of the power supply device. Then, the power supply circuit 10 initiates a negotiation with the device to be charged, and sends an instruction 1 (corresponding to the above-mentioned first instruction) to the device to be charged to query whether the device to be charged agrees that the power supply circuit 10 charges the device to be charged in the second charging mode.

When the power supply circuit 10 receives a reply instruction of the instruction 1 sent by the device to be charged and the reply instruction of the instruction 1 indicates that the device to be charged disagrees that the power supply circuit 10 charges the device to be charged in the second charging mode, the power supply circuit 10 detects the output current of the power supply circuit 10 again. When the output current of the power supply circuit 10 is still greater than or equal to 12 within a predetermined continuous time period (for example, may be a continuous time period T1), the power supply circuit 10 sends the instruction 1 again to the device to be charged to query whether the device to be charged agrees that the power supply circuit 10 charges the device to be charged in the second charging mode. The power supply circuit 10 repeats the above actions in stage 1, until the device to be charged agrees that the power supply circuit 10 charges the device to be charged in the second charging mode or until the output current of the power supply circuit 10 is no longer greater than or equal to 12.

After the device to be charged agrees that the power supply circuit 10 charges the device to be charged in the second charging mode, the communication procedure goes into stage 2

Stage 2:

The power supply circuit 10 sends an instruction 2 (corresponding to the above-mentioned second instruction) to the device to be charged to query whether the output voltage of the power supply circuit 10 (the present output voltage) matches the present voltage of the battery in the device to be charged.

The device to be charged sends a reply instruction of the instruction 2 to the power supply circuit 10, for indicating that the output voltage of the power supply circuit 10 matches the present voltage of the battery in the device to be charged, or is higher or lower than the present voltage of the battery in the device to be charged. When the reply instruction of the instruction 2 indicates that the output voltage of the power supply circuit 10 is higher or lower, the power supply circuit 10 may adjust the output voltage of the power supply circuit 10 to be lower or higher, and sends the instruction 2 to the device to be charged again to query whether the output voltage of the power supply circuit 10 matches the present voltage of the battery. The above actions in stage 2 are repeated, until the device to be charged determines that the output voltage of the power supply circuit 10 matches the present voltage of the battery in the device to be charged. Then, the communication procedure goes into stage 3. The output voltage of the power supply circuit 10 may be adjusted in various ways. For example, a plurality of voltage levels from low to high may be set for the output voltage of the power supply circuit 10 in advance. The higher the voltage level is, the larger the output voltage of the power supply circuit 10 is. When the reply instruction of the instruction 2 indicates that the output voltage of the power supply circuit 10 is higher, the voltage level of the output voltage of the power supply circuit 10 may be reduced by one level from the present voltage level. When the reply instruction of the instruction 2 indicates that the output voltage of the power supply circuit 10 is lower, the voltage level of the output voltage of the power supply circuit 10 may be increased by one level from the present voltage level.

Stage 3:

The power supply circuit 10 sends an instruction 3 (corresponding to the above-mentioned third instruction) to the device to be charged to query the maximum charging current presently supported by the device to be charged. The device to be charged sends a reply instruction of the instruction 3 to the power supply circuit 10 for indicating the maximum charging current presently supported by the device to be charged, and then the communication procedure goes into stage 4.

Stage 4:

The power supply circuit 10 determines the charging current outputted by the power supply circuit 10 in the second charging mode for charging the device to be charged according to the maximum charging current presently supported by the device to be charged. Then, the communication procedure goes into stage 5, i.e., the constant current charging stage.

Stage 5:

When the communication procedure goes into the constant current charging stage, the power supply circuit 10 may send an instruction 4 (corresponding to the above-mentioned fourth instruction) to the device to be charged at intervals to query the present voltage of the battery in the device to be charged. The device to be charged may send a reply instruction of the instruction 4 to the power supply circuit 10, to feed back the present voltage of the battery. The power supply circuit 10 may determine according to the present voltage of the battery whether the charging interface is in poor contact and whether it is necessary to decrease the output current of the power supply circuit 10. When the power supply circuit 10 determines that the charging interface is in poor contact, the power supply circuit 10 may send an instruction 5 (corresponding to the above-mentioned fifth instruction) to the device to be charged, and the power supply circuit 10 would quit the second charging mode, and then the communication procedure is reset and goes into stage 1 again.

In some embodiments, in stage 2, the time period from when the device to be charged agrees the power supply circuit 10 to charge the device to be charged in the second charging mode to when the power supply circuit 10 adjusts the output voltage of the power supply circuit 10 to a suitable charging voltage may be controlled in a certain range. If the time period exceeds a predetermined range, the power supply circuit 10 or the device to be charged may determine that the communication procedure is abnormal, such that the communication procedure is reset and goes into stage 1.

In some embodiments, in stage 2, when the output voltage of the power supply circuit 10 is higher than the present voltage of the battery in the device to be charged by $\Delta V$ ($\Delta V$ may be set to 200-500 mV), the device to be charged may send a reply instruction of the instruction 2 to the power supply circuit 10, for indicating that the output voltage of the power supply circuit 10 matches the voltage of the battery in the device to be charged.

In some embodiments, in stage 4, the adjusting speed of the output current of the power supply circuit 10 may be controlled to be in a certain range, thus avoiding an abnormity occurring in the charging process due to the too fast adjusting speed.

In some embodiments, in stage 5, the variation degree of the output current of the power supply circuit 10 may be controlled to be less than or equal to 5%.

In some embodiments, in stage 5, the power supply circuit 10 can monitor the path impedance of a charging loop in real time. In detail, the power supply circuit 10 can monitor the path impedance of the charging loop according to the output voltage of the power supply circuit 10, the output current of the power supply circuit 10 and the present voltage of the battery fed back by the device to be charged. When the path impedance of the charging loop is greater than a sum of the path impedance of the device to be charged and the impedance of the charging wire, it may be considered that the charging interface is in poor contact, and thus the power supply circuit 10 stops charging the device to be charged in the second charging mode.

In some embodiments, after the power supply circuit 10 starts to charge the device to be charged in the second charging mode, time intervals of communications between the power supply circuit 10 and the device to be charged may be controlled to be in a certain range, thus avoiding abnormity in the communication procedure due to the too short time interval of communications.

In some embodiments, the stop of the charging process (or the stop of the charging process that the power supply circuit 10 charges the device to be charged in the second charging mode) may be a recoverable stop or an unrecoverable stop.

For example, when it is detected that the battery in the device to be charged is fully charged or the charging interface is poor contact, the charging process is stopped and the charging communication procedure is reset, and the charging process goes into stage 1 again. Then, the device to be charged disagrees that the power supply circuit 10 charges the device to be charged in the second charging mode, and the communication procedure would not go into stage 2. The stop of the charging process in such a case may be considered as an unrecoverable stop.

For another example, when an abnormity occurs in the communication between the power supply circuit 10 and the device to be charged, the charging process is stopped and the charging communication procedure is reset, and the charging process goes into stage 1 again. After requirements for stage 1 are met, the device to be charged agrees that the power supply circuit 10 charges the device to be charged in the second charging mode to recover the charging process. In this case, the stop of the charging process may be considered as a recoverable stop.

For another example, when the device to be charged detects that an abnormity occurs in the battery, the charging process is stopped and the charging communication process is reset, and the charging process goes into stage 1 again. The device to be charged then disagrees that the power supply circuit 10 charges the device to be charged in the second charging mode. When the battery returns to normal and the requirements for stage 1 are met, the device to be charged agrees that the power supply circuit 10 charges the device to be charged in the second charging mode. In this case, the stop of fast charging process may be considered as a recoverable stop.

Communication actions or operations illustrated in FIG. 8 are merely exemplary. For example, in stage 1, after the device to be charged is coupled to the power supply circuit 10, the handshake communication between the device to be charged and the power supply circuit 10 may be initiated by the device to be charged. In other words, the device to be charged sends an instruction 1 to query the power supply circuit 10 whether to operate in the second charging mode. When the device to be charged receives a reply instruction indicating that the power supply circuit 10 agrees to charge the device to be charged in the second charging mode from the power supply circuit 10, the power supply circuit 10 starts to charge the battery in the device to be charged in the second charging mode.

For another example, after stage 5, there may be a constant voltage charging stage. In detail, in stage 5, the device to be charged may feed back the present voltage of the battery to the power supply circuit 10. The charging process goes into the constant voltage charging stage from the constant current charging stage when the present voltage of the battery reaches a voltage threshold for constant voltage charging. During the constant voltage charging stage, the charging current decreases gradually. When the current reduces to a certain threshold, it indicates that the battery in the device to be charged is fully charged, and the whole charging process is stopped.

Figure 9:
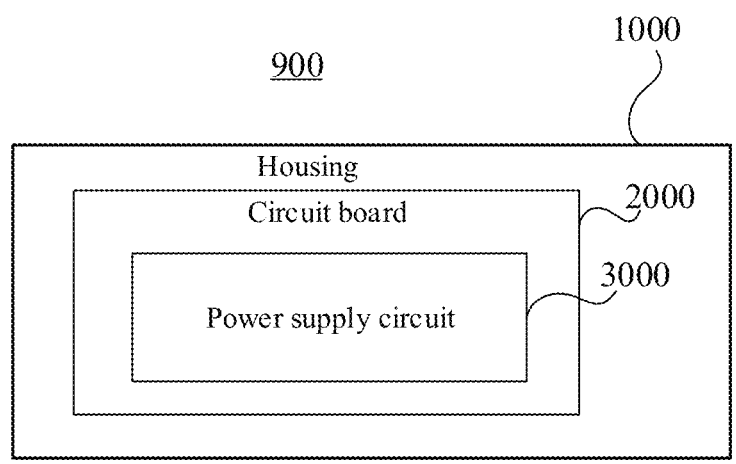
FIG. 9 is a block diagram of a power supply device according to an embodiment of the present disclosure.

Embodiments of the present disclosure further provide a power supply device. As illustrated in FIG. 9, the power supply device 900 may include a housing 1000, a circuit board 2000 and a power supply circuit 3000. The circuit board 2000 may be enclosed by the housing 1000. The power supply circuit 3000 may be positioned on the circuit board 2000. The power supply circuit 3000 may be the power supply circuit 10 provided in any embodiment of the present disclosure. The power supply device 900 may be a device specifically used for charging, such as an adapter or a power bank, or may be other devices capable of supplying power and data services, such as a computer.

Figure 10:
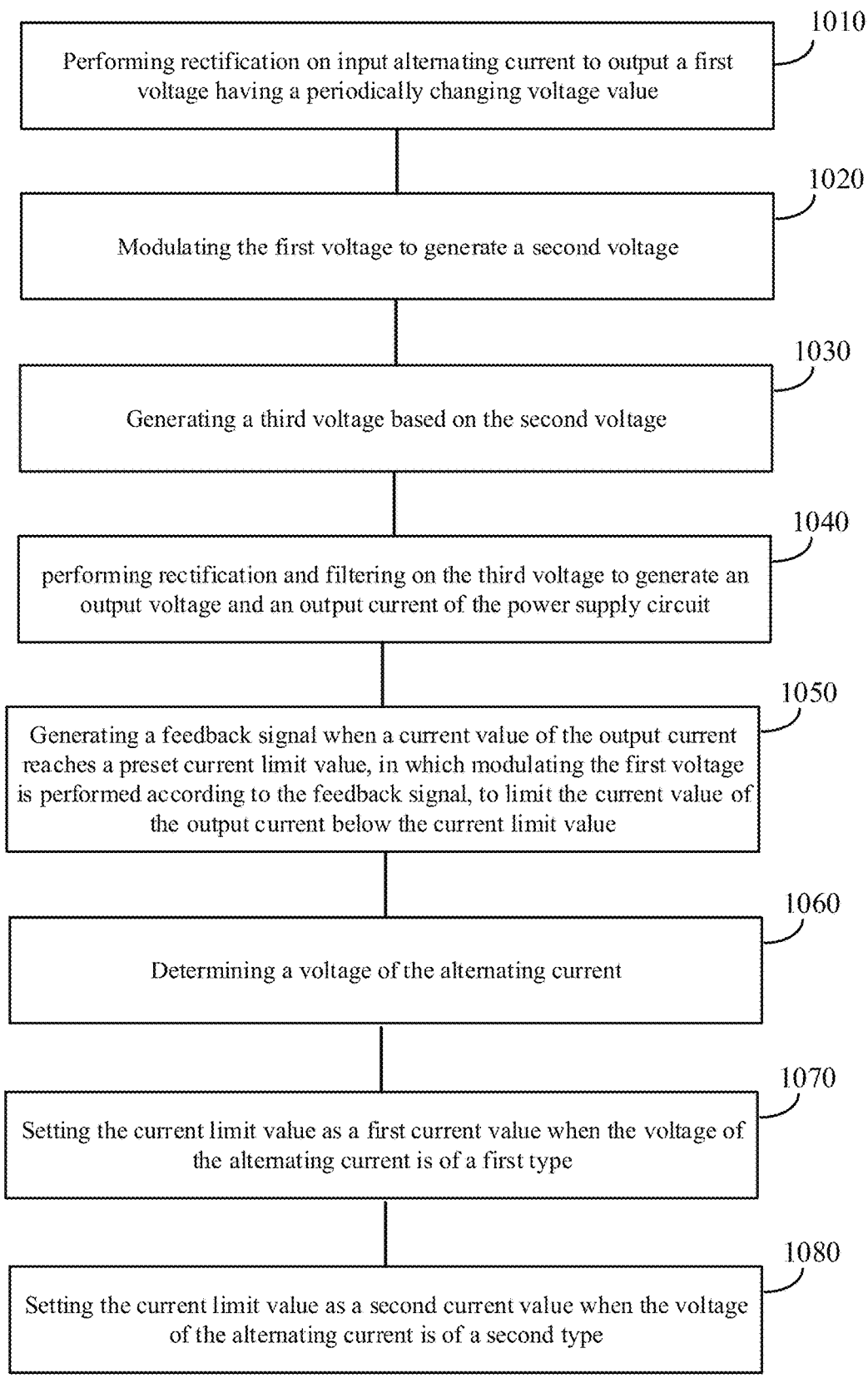
FIG. 10 is a schematic flow chart of a control method according to an embodiment of the present disclosure.

The power supply circuit and the power supply device provided by embodiments of the present disclosure have been described above in detail with reference to FIGS. 1-9. A control method of a power supply circuit provided by embodiments of the present disclosure will be described below in detail with reference to FIG. 10. As illustrated in FIG. 10, the control method may include following blocks.

At block 1010, rectification is performed on input alternating current to output a first voltage having a periodically changing voltage value.

At block 1020, the first voltage is modulated to generate a second voltage.

At block 1030, a third voltage is generated based on the second voltage.

At block 1040, rectification and filtering is performed on the third voltage to generate an output voltage and an output current of the power supply circuit.

At block 1050, a feedback signal is generated when a current value of the output current reaches a preset current limit value.

modulating the first voltage is performed according to the feedback signal, to limit the current value of the output current below the current limit value.

At block 1060, a voltage of the alternating current is determined.

At block 1070, when the voltage of the alternating current is of a first type, the current limit value is set as a first current value.

At block 1080, when the voltage of the alternating current is of a second type, the current limit value is set as a second current value.

An amplitude of the voltage of the first type is greater than that of the voltage of the second type, and the first current value is greater than the second current value.

In some embodiments, the method in FIG. 10 may further include communicating with a device to be charged, to adjust an output power of the power supply circuit, such that an output voltage and/or the output current of the power supply circuit matches a charging stage where a battery of the device to be charged is currently.

In some embodiments, the charging state in which the power supply circuit charges the battery includes at least one of a trickle charging stage, a constant current charging stage and a constant voltage charging stage.

In some embodiments, communicating with a device to be charged, to adjust an output power of the power supply circuit, such that the output voltage and/or the output current of the power supply circuit matches the charging stage where a battery of the device to be charged is currently, may include: in the constant voltage charging stage, communicating with the device to be charged, to adjust the output power of the power supply circuit, such that the output voltage of the power supply circuit matches a charging voltage corresponding to the constant voltage charging stage.

In some embodiments, communicating with a device to be charged, to adjust an output power of the power supply circuit, such that the output voltage and/or the output current of the power supply circuit matches the charging stage where a battery of the device to be charged is currently, may include: in the constant current charging stage, communicating with the device to be charged, to adjust the output power of the power supply circuit, such that the output current of the power supply circuit matches a charging current corresponding to the constant current charging stage.

With respect to the details of the control method, reference can be made to the above description regarding the power supply circuit, which will not be elaborated here for simplicity. Further, blocks may be executed in a different order. For example, blocks 1060-1080 may be executed before blocks 1010-1050, or may be executed simultaneously with blocks 1010-1050, which is not limited in embodiments of the present disclosure.

In above embodiments, it is possible to implement the embodiments fully or partially by software, hardware, firmware or any other combination. When implemented by software, it is possible to implement the embodiments fully or partially in a form of computer program products. The computer program product includes one or more computer instructions. When the computer program instructions are loaded and executed by the computer, procedures or functions according to embodiments of the present disclosure are fully or partially generated. The computer may be a general-purpose computer, a special-purpose computer, a computer network, or any other programmable device. The computer instructions may be stored in a computer readable storage medium, or may be transmitted from one computer readable storage medium to another computer readable storage medium. For example, the computer instructions may be transmitted from one website, computer, server or data center to another website, computer, server or data center in a wired manner (for example, via coaxial cables, fiber optics, or DSL (digital subscriber line)) or in a wireless manner (for example, via infrared, WiFi or microwave). The computer readable storage medium may be any available medium that are accessible by the computer, or a data storage device such as a server or a data center integrated with one or more available medium. The available medium may be magnetic medium (for example, floppy disk, hard disk and tape), optical medium (for example, DVD (digital video disc)), or semiconductor medium (for example, SSD (solid state disk)).

Those skilled in the art could be aware that, exemplary units and algorithm steps described in combination with embodiments disclosed herein may be implemented by electronic hardware, or by a combination of computer software and electronic hardware. Whether these functions are executed by hardware or software is dependent on particular use and design constraints of the technical solutions. Professionals may adopt different methods for different particular uses to implement described functions, which should not be regarded as going beyond the scope of the present disclosure.

In several embodiments provided by the present disclosure, it should be understood that, the disclosed system, device and method may be implemented in other ways. For example, the device embodiments described above are merely illustrative. For example, the units are merely divided according to logic functions, and can be divided in other ways in actual implementation. For example, a plurality of units or components may be combined or may be integrated into another system, or some features may be ignored or not executed. In addition, the mutual coupling or direct coupling or communication connection illustrated or discussed may be via some interfaces, or direct coupling or communication connection of devices or units may be in an electrical, mechanical, or other form.

Units illustrated as separate components may be or may not be physically separated, and components illustrated as units may be or may not be physical units, i.e., may be located at a same place, or may be distributed onto multiple network units. Some or all of the units may be selected to implement the purpose of the solution in an embodiment according to actual demands.

Moreover, respective functional units in respective embodiments of the present disclosure may be integrated in one processing unit, or the respective units may be separate physical existence, or two or more units may be integrated in one unit.

Above description is merely specific implementation of the present disclosure. However, the protection scope of the present disclosure is not limited to this. Any change or substitute that is conceivable by those skilled in the art should be in the protection scope of the present disclosure. Thus, the protection scope of the present disclosure should be defined as the protection scope of claims.

What is claimed is:

1. A power supply circuit, comprising:
    a primary rectifier unit, configured to perform rectification on input alternating current to output a first voltage having a periodically changing voltage value;
    a modulation unit, configured to modulate the first voltage to generate a second voltage;
    a transformer, configured to generate a third voltage based on the second voltage;
    a secondary rectifier and filtering unit, configured to perform rectification and filtering on the third voltage to generate an output voltage and an output current of the power supply circuit;
    a current feedback unit, configured to receive the output current, and to generate a feedback signal when a current value of the output current equals to or is greater than a preset current limit value, such that the output current is adjusted based on the feedback signal;
    a first rectifier unit, configured to receive the third voltage, and to perform rectification on the third voltage to obtain a fourth voltage;
    a first filtering unit, configured to receive the fourth voltage, and to perform filtering on the fourth voltage to obtain a fifth voltage;
    a voltage signal conversion unit, configured to determine a type of the voltage of the alternating current according to the fifth voltage, in which the voltage signal conversion unit comprises a voltage-stabilizing tube and a triode, when both the voltage-stabilizing tube and the triode are switched on and a collector of the triode is at a low level based on a voltage value of the fifth voltage, the type of the voltage of the alternative current is a first type, and when both the voltage-stabilizing tube and the triode are switched off and the collector of the triode is at a high level based on the voltage value of the fifth voltage, the type of the voltage of the alternating current is a second type, in which an amplitude of the voltage of the first type is greater than that of the voltage of the second type; and
    a control unit, configured to set the preset current limit value as a first current value when the type of the voltage of the alternating current is the first type, and to set the preset current limit value as a second current value when the type of the voltage of the alternating current is the second type, in which the first current value is greater than the second current value.

2. The power supply circuit of claim 1, wherein the modulation unit is configured to receive the feedback signal, and in response to the feedback signal, modulate the first voltage to adjust the second voltage, such that the current value of the output current obtained based on the second voltage adjusted is limited below the preset current limit value.

3. The power supply circuit of claim 1, wherein the voltage signal conversion unit is configured to sample the fifth voltage to determine the type of the voltage of the alternating current according to a sampling voltage of the fifth voltage.

4. The power supply circuit of claim 1, wherein the current feedback unit comprises:
a current sampling unit, configured to sample the output current of the power supply circuit; and
an operational amplifier, wherein a positive input end of the operational amplifier is coupled to the control unit, and a negative input end of the operational amplifier is coupled to an output of the current sampling unit,
wherein the control unit is configured to adjust the preset current limit value of the current feedback unit by adjusting a reference voltage received by the positive input end of the operational amplifier.

5. The power supply circuit of claim 1, wherein the control unit is further configured to communicate with a device to be charged, to adjust an output power of the power supply circuit, such that an output voltage and/or the output current of the power supply circuit matches a charging stage where a battery of the device to be charged is currently.

6. The power supply circuit of claim 5, wherein the charging state in which the power supply circuit charges the battery comprises at least one of a trickle charging stage, a constant current charging stage and a constant voltage charging stage.

7. The power supply circuit of claim 6, wherein the control unit is configured to:
in the constant voltage charging stage, communicate with the device to be charged, to adjust the output power of the power supply circuit, such that the output voltage of the power supply circuit matches a charging voltage corresponding to the constant voltage charging stage.

8. The power supply circuit of claim 6, wherein the control unit is configured to:
in the constant current charging stage, communicate with the device to be charged, to adjust the output power of the power supply circuit, such that the output current of the power supply circuit matches a charging current corresponding to the constant current charging stage.

9. A power supply device, comprising:
a housing, a circuit board, and a power supply circuit, wherein:
the circuit board is enclosed by the housing;
the power supply circuit is positioned on the circuit board; and
the power supply circuit comprises:
a primary rectifier unit, configured to perform rectification on input alternating current to output a first voltage having a periodically changing voltage value;
a modulation unit, configured to modulate the first voltage to generate a second voltage;
a transformer, configured to generate a third voltage based on the second voltage;
a secondary rectifier and filtering unit, configured to perform rectification and filtering on the third voltage to generate an output voltage and an output current of the power supply circuit;
a current feedback unit, configured to receive the output current, and to generate a feedback signal in response to detecting that a current value of the output current equals to or is greater than a preset current limit value, such that the output current is adjusted based on the feedback signal;
a first rectifier unit, configured to receive the third voltage, and to perform rectification on the third voltage to obtain a fourth voltage;
a first filtering unit, configured to receive the fourth voltage, and to perform filtering on the fourth voltage to obtain a fifth voltage;
a voltage signal conversion unit, configured to determine a type of the voltage of the alternating current according to the fifth voltage, in which the voltage signal conversion unit comprises a voltage-stabilizing tube and a triode, when both the voltage-stabilizing tube and the triode are switched on and a collector of the triode is at a low level based on a voltage value of the fifth voltage, the type of the voltage of the alternative current is a first type, and when both the voltage-stabilizing tube and the triode are switched off and the collector of the triode is at a high level based on the voltage value of the fifth voltage, the type of the voltage of the alternating current is a second type, in which an amplitude of the voltage of the first type is greater than that of the voltage of the second type; and
a control unit, configured to set the preset current limit value of the current feedback unit as a first current value when the type of the voltage of the alternating current is the first type, and to set the preset current limit value of the current feedback unit as a second current value when the type of the voltage of the alternating current is the second type, in which the first current value is greater than the second current value.

10. The power supply device of claim 9, wherein the power supply device is an adapter.

11. The power supply device of claim 9, wherein the modulation unit is configured to receive the feedback signal, and in response to the feedback signal, modulate the first voltage to adjust the second voltage, such that the current value of the output current obtained based on the second voltage adjusted is limited below the preset current limit value.

12. The power supply circuit of claim 9, wherein the voltage signal conversion unit is configured to sample the fifth voltage to determine the type of the voltage of the alternating current according to a sampling voltage of the fifth voltage.

13. The power supply device of claim 9, wherein the current feedback unit comprises:
a current sampling unit, configured to sample the output current of the power supply circuit; and
an operational amplifier, wherein a positive input end of the operational amplifier is coupled to the control unit, and a negative input end of the operational amplifier is coupled to an output of the current sampling unit,
wherein the control unit is configured to adjust the preset current limit value of the current feedback unit by adjusting a reference voltage received by the positive input end of the operational amplifier.

14. A control method of a power supply circuit, comprising:
performing rectification on input alternating current to output a first voltage having a periodically changing voltage value;
modulating the first voltage to generate a second voltage;
generating a third voltage based on the second voltage;

performing rectification and filtering on the third voltage to generate an output voltage and an output current of the power supply circuit;

generating a feedback signal in response to detecting that a current value of the output current equals to or is greater than a preset current limit value, wherein the output current is adjusted based on the feedback signal;

performing rectification on the third voltage to generate a fourth voltage;

performing filtering on the fourth voltage to generate a fifth voltage determining a type of a voltage of the alternating current based on the fifth voltage with a voltage-stabilizing tube and a triode, when both the voltage-stabilizing tube and the triode are switched on and a collector of the triode is at a low level based on a voltage value of the fifth voltage, the type of voltage of the alternative current is a first type, and when both the voltage-stabilizing tube and the triode are switched off and the collector of the triode is at a high level based on the voltage value of the fifth voltage, the type of the voltage of the alternating current is a second type, in which an amplitude of the voltage of the first type is greater than that of the voltage of the second type;

setting the preset current limit value as a first current value when the type of the voltage of the alternating current is the first type; and setting the preset current limit value as a second current value when the type of the voltage of the alternating current is the second type, in which the first current value is greater than the second current value.

15. The control method of claim 14, further comprising:

communicating with a device to be charged, to adjust an output power of the power supply circuit, such that an output voltage and/or the output current of the power supply circuit matches a charging stage where a battery of the device to be charged is currently.

16. The control method of claim 15, wherein the charging state in which the power supply circuit charges the battery comprises at least one of a trickle charging stage, a constant current charging stage and a constant voltage charging stage.

17. The control method of claim 16, wherein communicating with the device to be charged, to adjust the output power of the power supply circuit, such that the output voltage and/or the output current of the power supply circuit matches the charging stage where the battery of the device to be charged is currently, comprises:

in the constant voltage charging stage, communicating with the device to be charged, to adjust the output power of the power supply circuit, such that the output voltage of the power supply circuit matches a charging voltage corresponding to the constant voltage charging stage.

18. The control method of claim 16, wherein communicating with the device to be charged, to adjust the output power of the power supply circuit, such that the output voltage and/or the output current of the power supply circuit matches the charging stage where the battery of the device to be charged is currently, comprises:

in the constant current charging stage, communicating with the device to be charged, to adjust the output power of the power supply circuit, such that the output current of the power supply circuit matches a charging current corresponding to the constant current charging stage.

19. The control method of claim 14, wherein converting the fifth voltage to the indication signal comprises:

sampling the fifth voltage to obtain a sampling voltage, in which the type of the voltage of the alternating current is determined according to a sampling voltage of the fifth voltage.

20. The control method of claim 14, wherein the preset current limit value is adjusted by adjusting a reference voltage received by a positive input end of operational amplifier.

* * * * *